(12) United States Patent
Kawagoe et al.

(10) Patent No.: US 6,178,365 B1
(45) Date of Patent: Jan. 23, 2001

(54) STEERING CONTROL SYSTEM FOR VEHICLE

(75) Inventors: Hiroyuki Kawagoe; Shinnosuke Ishida; Tomoaki Teramoto; Kaoru Matsuno, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/151,761

(22) Filed: Sep. 11, 1998

(30) Foreign Application Priority Data

Sep. 13, 1997 (JP) .................................................. 9-268048

(51) Int. Cl.$^7$ .............................. G06F 19/00; G06F 17/00
(52) U.S. Cl. ................. 701/41; 701/1; 180/167; 180/168; 180/169; 180/280; 180/421; 180/422
(58) Field of Search .................................. 701/41, 1, 23; 180/168, 167, 169, 421, 422, 280

(56) References Cited

U.S. PATENT DOCUMENTS

| | | | |
|---|---|---|---|
| 5,904,223 | * | 5/1999 | Shimizu et al. ...................... 180/443 |
| 5,913,375 | * | 6/1999 | Nishikawa ............................ 180/168 |
| 5,927,430 | * | 7/1999 | Mukai et al. ......................... 180/446 |
| 6,041,884 | * | 3/2000 | Shimizu et al. ...................... 180/443 |
| 6,053,270 | * | 4/2000 | Nishikawa et al. .................. 180/168 |

FOREIGN PATENT DOCUMENTS 5-197423    8/1993 (JP) .

* cited by examiner

Primary Examiner—William A. Cuchlinski, Jr.
Assistant Examiner—Olga Hernandez
(74) Attorney, Agent, or Firm—Arent Fox Kintner Plotkin & Kahn, PLLC

(57) ABSTRACT

A system for controlling steering of a vehicle, including a steering device such as a steering wheel with an electric motor which assists steering of driven wheels of the vehicle, first steering control unit for controlling the motor, a CCD camera for detecting a lane condition of a road on which the vehicle travels, a yaw rate sensor for detecting motion of the vehicle, steering assist torque calculating unit for calculating a steering assist torque necessary for holding the lane, a torque sensor for detecting an actual steering torque manually applied to the steering device by the driver, and second steering control unit for calculating a torque command to be output to the first steering control unit based on the steering assist torque calculated by the steering assist torque calculating unit and the detected steering torque to control the actuator such that the torque command decreases. In the system, a switching device is provided for switching between modes of control by the first steering control unit and the second steering control unit gradually with respect to time, thereby ensuring to switch the mode of control smoothly and preventing the occurrence of disadvantages including that the vehicle driver experiences annoyance upon sensing a change in steering assist.

17 Claims, 11 Drawing Sheets

STEERING CONTROL SYSTEM FOR VEHICLE

BACKGROUND OF THE INVENTION

1. Field of the Invention

This invention relates to a steering control system for a vehicle.

2. Description of the Related Art

Earlier patent applications proposed by the assignee, including those made public by Japanese Laid-Open Patent Application Nos. Hei 5(1993)-197,423 and Hei 9(1997)-221,054, teach vehicle steering control system technologies that provide steering angle assistance for keeping the vehicle on a desired course of travel along a lane of a road.

By providing fine steering assistance while preventing vehicle lane wandering, these technologies greatly reduce the burden on the driver, which tends to increase particularly during long, high-speed driving on an expressway or the like.

In view of the interference or interaction between this type of steering assistance control and driver steering, the control should preferably be effected to provide assistance through torque (steering force) rather than steering angle.

When the vehicle is equipped with both a lane holding steering torque assist control system of such type and a steering torque assist control system of the power steering, hereinafter referred to as the power steering torque assist, an issue arises regarding how to switch the mode of control between the two systems. If the assist torque changes abruptly at the time of switching, this will be disadvantageous in that, for example, the vehicle driver experiences annoyance upon sensing a change in steering torque assist.

SUMMARY OF THE INVENTION

An object of this invention is therefore to provide a steering control system for a vehicle that, in a vehicle equipped with two types of steering torque assist control systems, determines the assist torque to ensure switching of the mode of control smoothly, thereby preventing the occurrence of disadvantages including that the vehicle driver experiences annoyance upon sensing a change in steering torque assist.

Moreover, when the steering torque assist control is conducted in such a manner that the vehicle travels along a (lane holding steering torque assist), if the driver has an intention to steer by himself for a reason such as to change lanes or to avoid an obstacle on the road, the mode of control should preferably be switched immediately from the lane holding steering torque assist control to the torque assist of the ordinary power steering.

Another object of this invention is therefore to provide a steering control system for a vehicle that, in a vehicle equipped with two types of steering torque assist control systems, enables immediate switching of the mode of control from the lane holding steering torque assist to the torque assist of the ordinary power steering in response to the driver's intention.

Furthermore, if the steering torque assist control is switched to that of the power steering torque assist in response to the driver's intention as mentioned above, it should still preferable to ensure smooth switching so as not to cause disadvantages from occurring including that the vehicle driver experiences annoyance upon sensing a change in steering torque assist.

Still another object of this invention is therefore to provide a steering control system for a vehicle that, in a vehicle equipped with two types of steering torque assist control systems, determines the assist torque to ensure smooth switching of the mode of control when the switching is effected in response to the driver's intention, thereby preventing disadvantages including that the vehicle driver experiences annoyance upon sensing a change in steering torque assist.

In order to achieve this object, there is provided a system for controlling steering of a vehicle, including: steering means having an actuator which steers driven wheels of the vehicle; first steering control means for controlling the actuator; first detecting means for detecting a lane condition of a road on which the vehicle travels; second detecting means for detecting motion of the vehicle; steering assist torque calculating means for calculating a steering assist torque necessary for holding a positional relationship between the vehicle and the lane condition; torque detecting means for detecting a steering torque manually applied to the steering means by the driver; and second steering control means for calculating a torque command to be output to the first steering control means based on the steering assist torque calculated by the steering assist torque calculating means and the detected steering torque to control the actuator such that the torque command decreases. Said system includes switching means for switching between the mode of control by the first steering control means and the mode of control by the second steering control means gradually with respect to time, thereby ensuring to switch the mode of control smoothly and preventing the occurrence of disadvantages including that the vehicle driver experiences annoyance upon sensing a change in steering assist.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
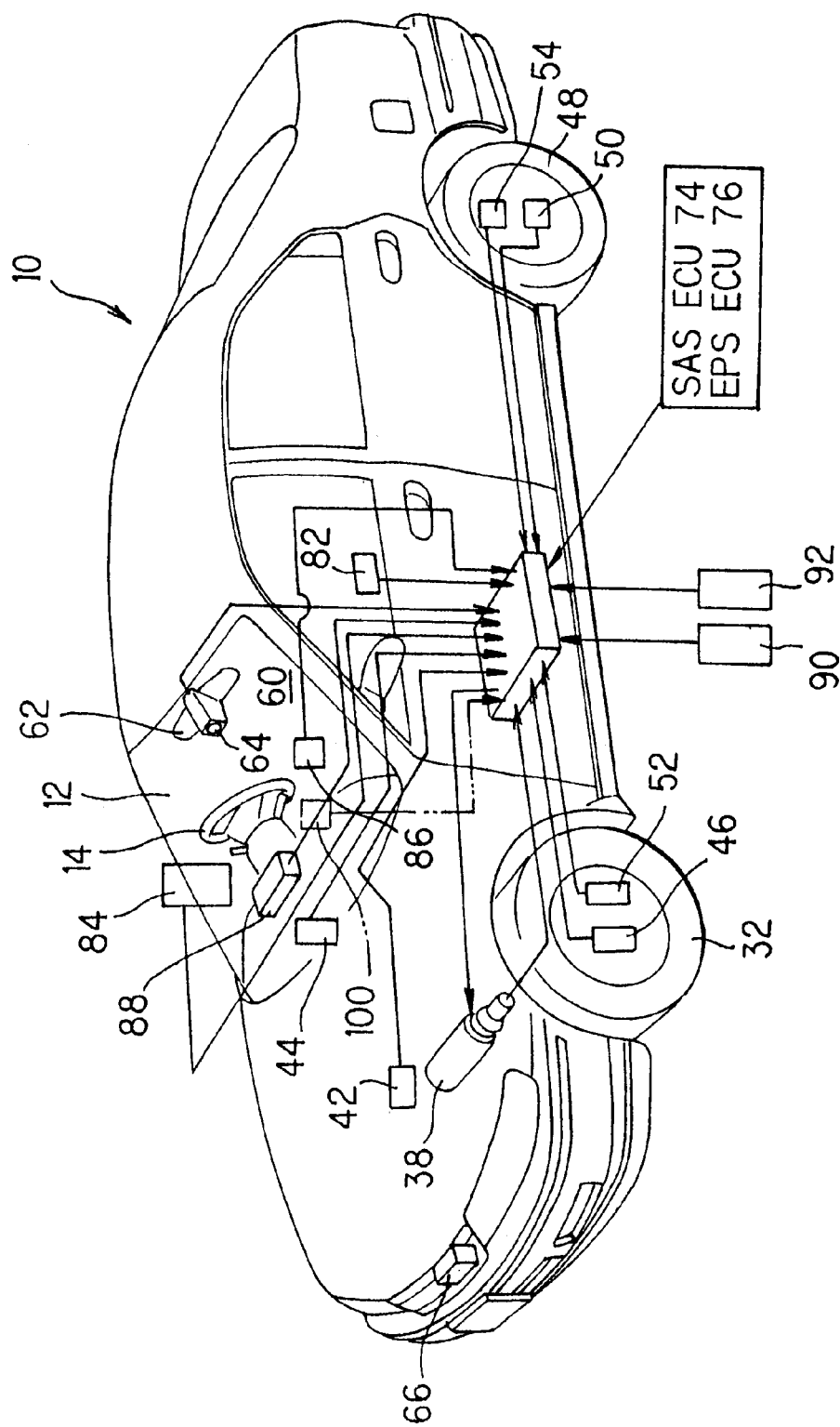
FIG. 1 is a schematic view showing the overall configuration of a vehicle steering control system according to the present invention.
Figure 2:
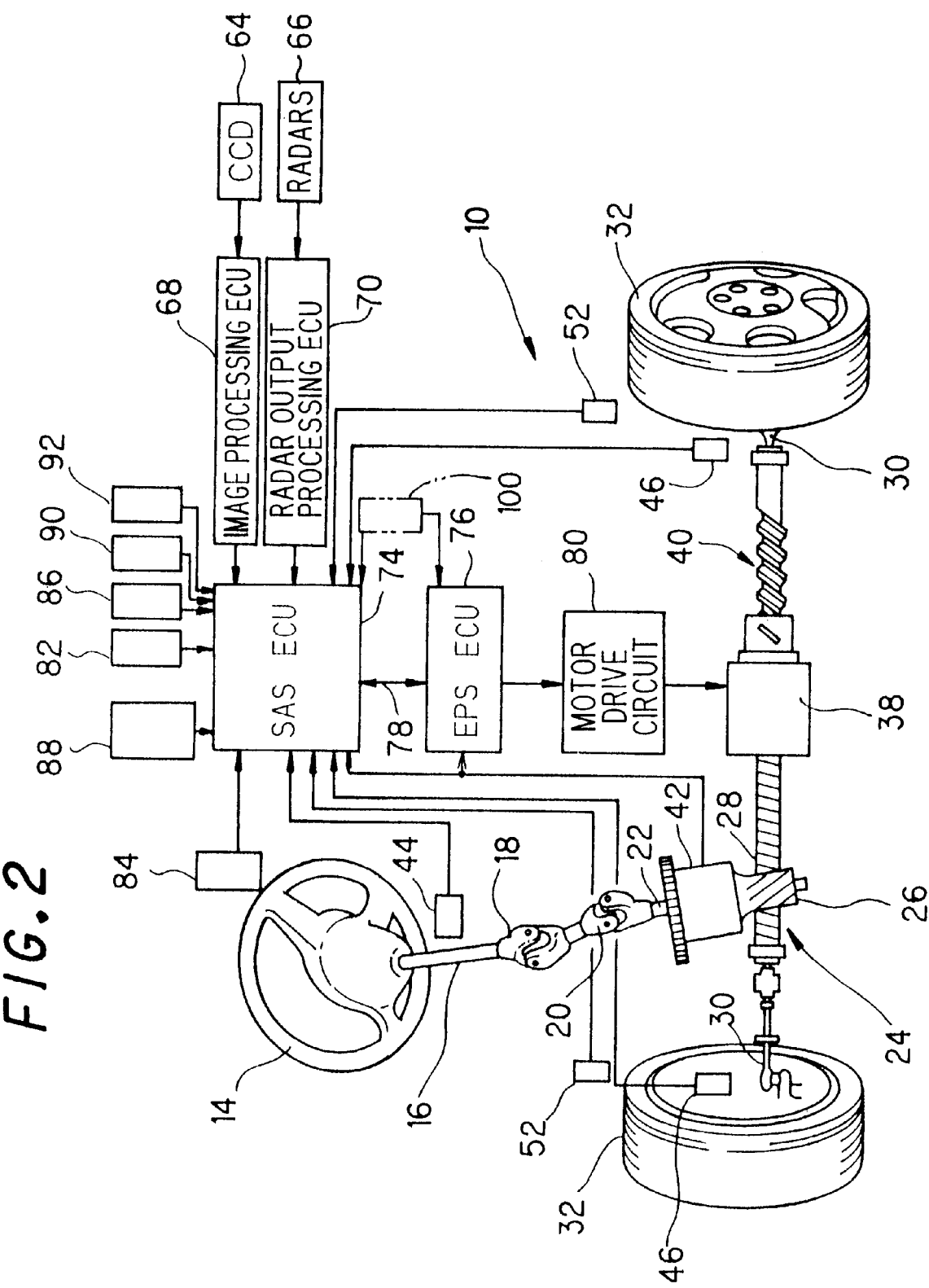
FIG. 2 is an explanatory view showing the configuration of a steering mechanism illustrated in FIG. 1.

FIG. 1 is an overall schematic view of a vehicle steering control system according to the invention. FIG. 2 is an explanatory view of the system with particular focus on the steering mechanism.

As shown in FIGS. 1 and 2, a steering wheel 14 located at the driver's seat 12 of a vehicle 10 is connected to a steering shaft 16 that is in turn connected through universal joints 18, 20 to a connecting shaft 22.

The connecting shaft 22 is connected to a pinion 26 of a rack-and-pinion steering gear assembly 24. The pinion 26 is engaged with a rack 28. Rotary motion input from the steering wheel 14 passes through the pinion 26 to be converted into linear motion of the rack 28. The linear motion passes through tie rods (steering rods) 30, 30 at the opposite ends of the front axle to turn two front wheels (steered wheels) 32, 32 in the desired direction around the associated king pins (not shown).

An electric motor 38 and a ball-screw mechanism 40 are disposed coaxially with the rack 28. The output of the motor 38 is converted into linear motion of the rack 28 by a ball-screw mechanism 40 so as to move the rack 28 in the direction that reduces or assists the steering force (steering torque) input through the steering wheel 14.

A torque sensor 42 provided in the vicinity of the rack-and-pinion steering gear 24 outputs a signal indicating the direction and magnitude of the steering force (steering torque) input by the driver. A steering angle sensor 44 provided in the vicinity of the steering shaft 16 outputs a signal indicating the direction and magnitude of the steering angle θ input by the driver. The steering angle sensor 44 is a rotary encoder or the like.

Wheel speed sensors 46, 46 provided one in the vicinity of each of the front wheels 32, 32 and wheel speed sensors 50, 50 (FIG. 1; only one shown) provided one in the vicinity of each of two rear wheels 48, 48 (only one shown) output signals once every rotation of the associated front and rear wheels. The wheel speed sensors 46, 46 and 50, 50 are magnetic pick-ups or the like. The front wheels 32, 32 are powered by an engine (not shown) mounted at the front of the vehicle 10. The rear wheels 48, 48 are idle.

A vehicle height sensor 52 is provided in the vicinity of the suspension mechanism (not shown) of each front wheel 32 and a vehicle height sensor 54 is provided in the vicinity of the suspension mechanism (not shown) of each rear wheel 48. Based on the stroke (displacement) of the associated suspension mechanism, each height sensor outputs a signal indicating the height of the vehicle 10 at the sensor location.

As shown in FIG. 1, a single CCD (charge coupled device) camera 64 combined with rear-view mirror 62 is attached to the inner surface of the windshield 60 above the driver's seat 12. Multiple radars 66 (operative in millimeter wave; only one radar shown in FIG. 1) are provided at appropriate locations near the front bumper of the vehicle 10 and emit modulated waves to the front.

The CCD camera 64 is dedicated to imaging the road ahead of the vehicle. As shown in FIG. 2, the image signal output by the CCD camera 64 is forwarded to an image processing ECU (electronic control unit) 68, comprised of a microcomputer, that extracts the lane boundaries (white lines) painted on the road. The outputs of the millimeter wave radars 66 are forwarded to a radar output processing ECU 70, also comprised of a microcomputer, where they are mixed with a received wave obtained through an antenna (not shown) and used to discriminate whether or not a solid object such as other vehicle locates ahead of the vehicle 10.

The vehicle steering control system according to the invention also has an electronic control unit (shown as SAS ECU) 74, also comprised of a microcomputer. The outputs of the image processing ECU 68, the radar output processing ECU 70 and the torque sensor 42 etc. are input to the SAS ECU 74.

The system is also equipped with a second electronic control unit (shown as EPS ECU) 76 comprised of a microcomputer. The EPS ECU 76 computes the power steering torque assist amount. The output of the torque sensor 42 is input to the EPS ECU 76.

The SAS ECU 74 and the EPS ECU 76 can communicate with each other through a signal line 78. The SAS ECU 74 computes the steering torque assist amount as explained later and forwards the computed data to the EPS ECU 76.

The EPS ECU 76 uses the steering torque assist amount data received from the SAS ECU 74 to compute a command value in duty ratio in terms of PWM (pulse-width modulation) and outputs it to a motor drive circuit 80. The motor drive circuit 80, which is equipped with a bridge circuit (not shown) composed of four power FET switching devices, drives the electric motor 38 in response to the command value.

A yaw rate sensor 82 (FIG. 1) is installed at a location near the center of gravity of the vehicle 10. The yaw rate sensor 82 outputs a signal indicating the yaw rate (angular velocity of yaw) around the vertical (gravitational) axis at the vehicle center of gravity.

An appropriate number of tactile pressure sensors 84 provided on the steering wheel 14 output pressure signals indicating whether or not the driver is manipulating the steering wheel. An appropriate number of second tactile pressure sensors 86 installed under the driver's seat output signals indicating whether or not the driver is seated.

A navigator 88 provided in the area of the dashboard is equipped with a memory device storing road information (map information) regarding the region where the vehicle 10 travels.

A brake sensor 90 associated with the brake pedal (not shown) near the floor at the driver's seat 12 outputs a signal indicating the amount of depression of the brake pedal by the driver. An accelerator sensor 92 associated with the accelerator pedal (not shown) outputs a signal indicating the amount of depression of the accelerator pedal by the driver.

The operation of the system will now be explained.

First, for ease of understanding, an overall explanation of the control by the SAS ECU 74 and the EPS ECU 76 will be given.

Figure 3:
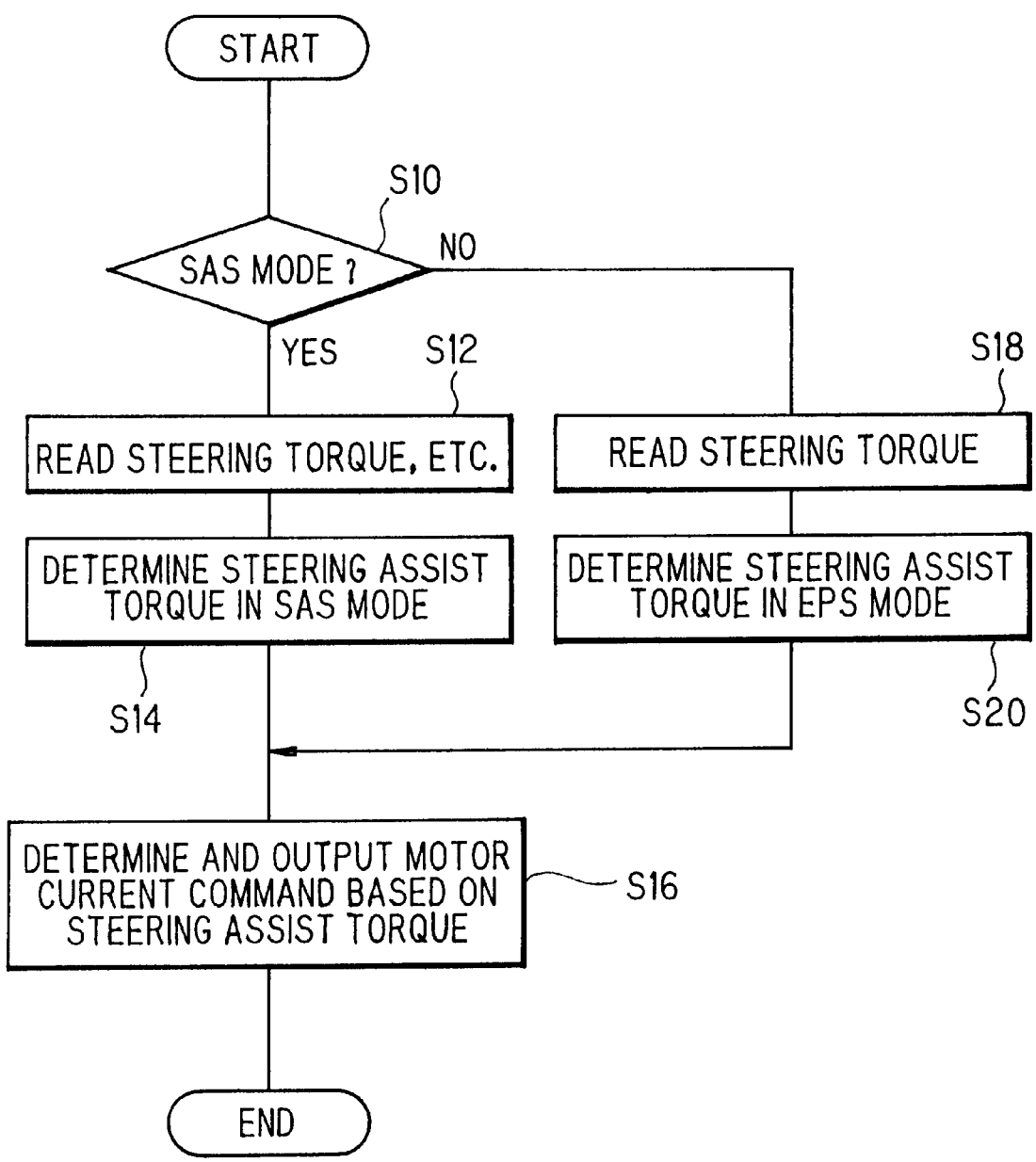
FIG. 3 is a flow chart showing the steering control by an SAS ECU and an EPS ECU illustrated in FIG. 2.

FIG. 3 is a flow chart showing the operations conducted by the microcomputer in the SAS ECU 74.

The program begins at S10 in which it is determined whether steering torque control is in the SAS mode, more specifically it is determined whether the SAS ECU 74 is conducting the lane holding steering torque assist control.

It should be noted that the embodiment is configured such that basically, the SAS ECU 74 conducts the lane holding steering torque assist control, while the EPS ECU 76 takes over the control when the vehicle driver explicitly expresses the intention to steer by himself.

When the result in S10 is affirmative, the program proceeds to S12 in which the output of the torque sensor 42 indicative of the steering torque τh applied by the driver and other outputs such as the output from the image processing ECU 68 are read. The program then proceeds to S14 in which the SAS ECU 74 determines or computes the lane holding steering assist torque for keeping the vehicle 10 traveling parallel with the lane (lane boundaries).

Although this determination is conducted by a separate routine not shown in the drawings, the principle will be briefly explained with reference to FIGS. 4 and 5.

Figure 6:
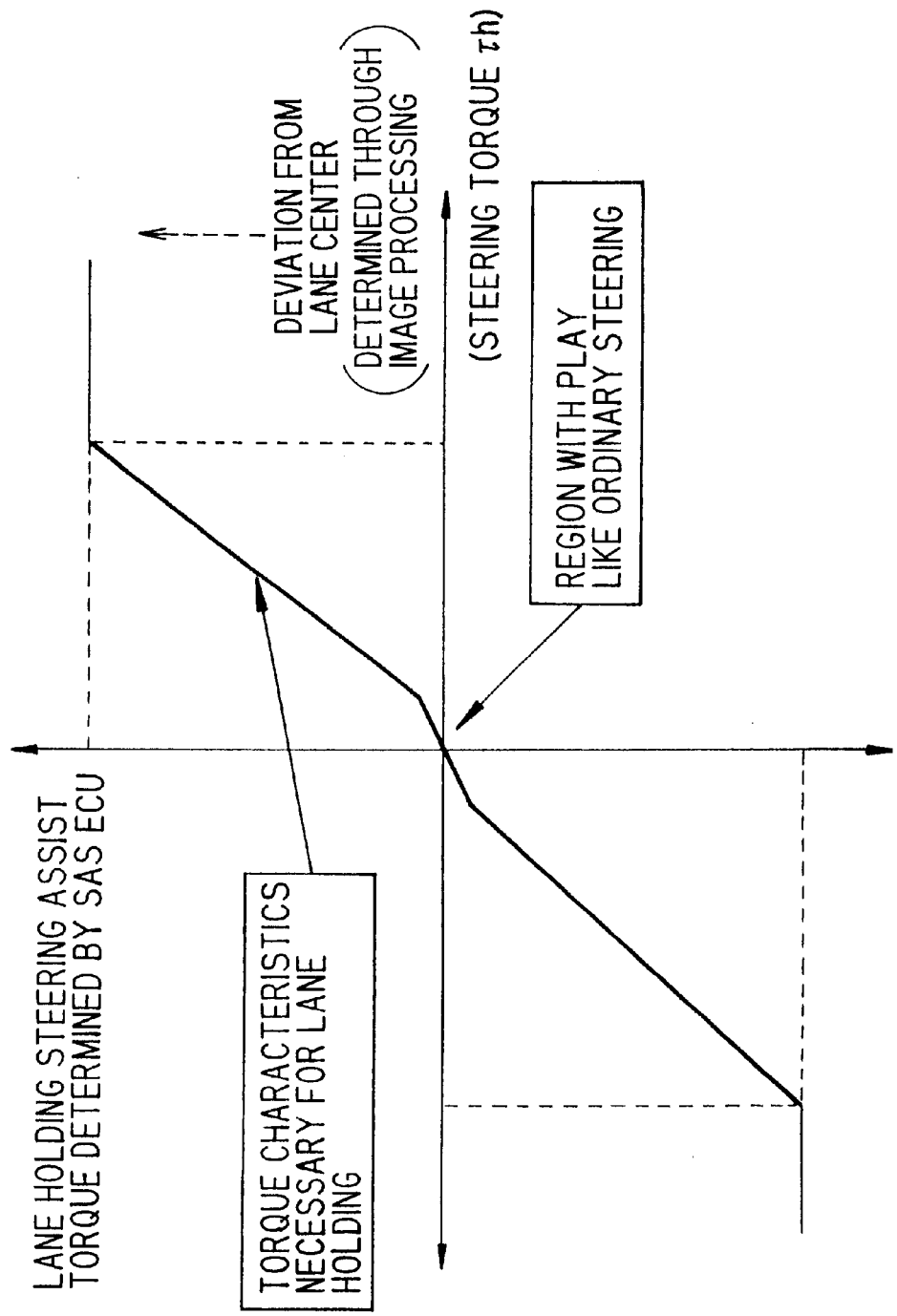
FIG. 6 is a graph showing the characteristics of steering assist torque determined by the SAS ECU and the EPS ECU illustrated in FIG. 2.

A desired sequence of points is calculated from the lane boundaries obtained by image processing the output of the CCD camera 64 in the image processing ECU 68. A desired yaw rate is calculated from the desired sequence of points. As shown in FIG. 6, an assist torque is calculated in accordance with deviation from the lane center and control is effected to achieve a course determined based on the desired yaw rate. Since this control is described in detail in a Japanese patent application filed by the assignee on the same date as that for present invention, it will not be explained further here.

Returning to the explanation of FIG. 3, the program then proceeds to S16 in which motor current command is determined based on the computed steering assist torque (more precisely, a torque command TA in FIG. 4) and is output to the motor drive circuit 80.

On the other hand, when the result in S10 is negative, the program proceeds to S18 in which the aforesaid steering torque $\tau h$ input by the driver is read, to S20 in which the power steering assist torque is determined or computed. FIG. 6 shows the characteristics of this kind of the steering assist torque. The power steering assist torque is determined in response to the detected steering torque (mentioned in the figure while enclosed by parentheses). More precisely, when the result in S10 is negative, the SAS ECU 74 communicates with the EPS ECU 76 through the signal line 78 such that the EPS ECU 76 conducts the procedures shown in S18 and S20.

Based on the above, the operation of the system will be explained with reference to the flow chart shown in FIG. 7. FIG. 8 is a block diagram showing the operation in a functional manner.

The operation shown is focused on switching the mode of control between the SAS ECU 74 and the EPS ECU 76. This program is conducted in the microcomputer in the EPS ECU 76 which communicates with the SAS ECU 74 to activate the same if needed. This program is looped once ever 0.5 msec interval.

The program begins at S100 in which it is determined whether steering torque control is in the SAS mode (control conducted by SAS ECU 74).

Assume, for example, that the preceding cycles were in the EPS mode (control conducted by the EPS ECU 76) and is now switched to the SAS mode. More specifically, as illustrated in a time chart shown in FIG. 9, it was the EPS mode (depicted by solid lines), but is switched or shifted to the SAS mode (depicted by broken lines).

Accordingly, the result in S100 is affirmative, and the program proceeds to S102 in which it is determined whether procedures for mode switching (explained later with reference to S112) has been finished. Since it is assumed in the present example that the control is just switched, the result is naturally negative, and the program proceeds to S104 in which the bit of a flag F_CHG is inverted, i.e., is set to 1, to S106 in which the flag bit is checked.

Since the flag bit was just set to 1, the program proceeds to S108 in which the detected steering torque $\tau h$ is read, to S110 in which the EPS ECU 76 determines the power steering assist torque by retrieving the characteristics (shown in FIG. 6) using the detected steering torque as address datum.

The program then proceeds to S112 in which the aforesaid procedures for mode switching are conducted. Specifically, the procedures are to determine a constituent ratio of the EPS power steering assist torque and the SAS lane holding steering assist torque, on the assumption that the sum of the constituent ratios of the respective steering assist torque of the EPS mode and the SAS mode is 100%.

Figure 9:
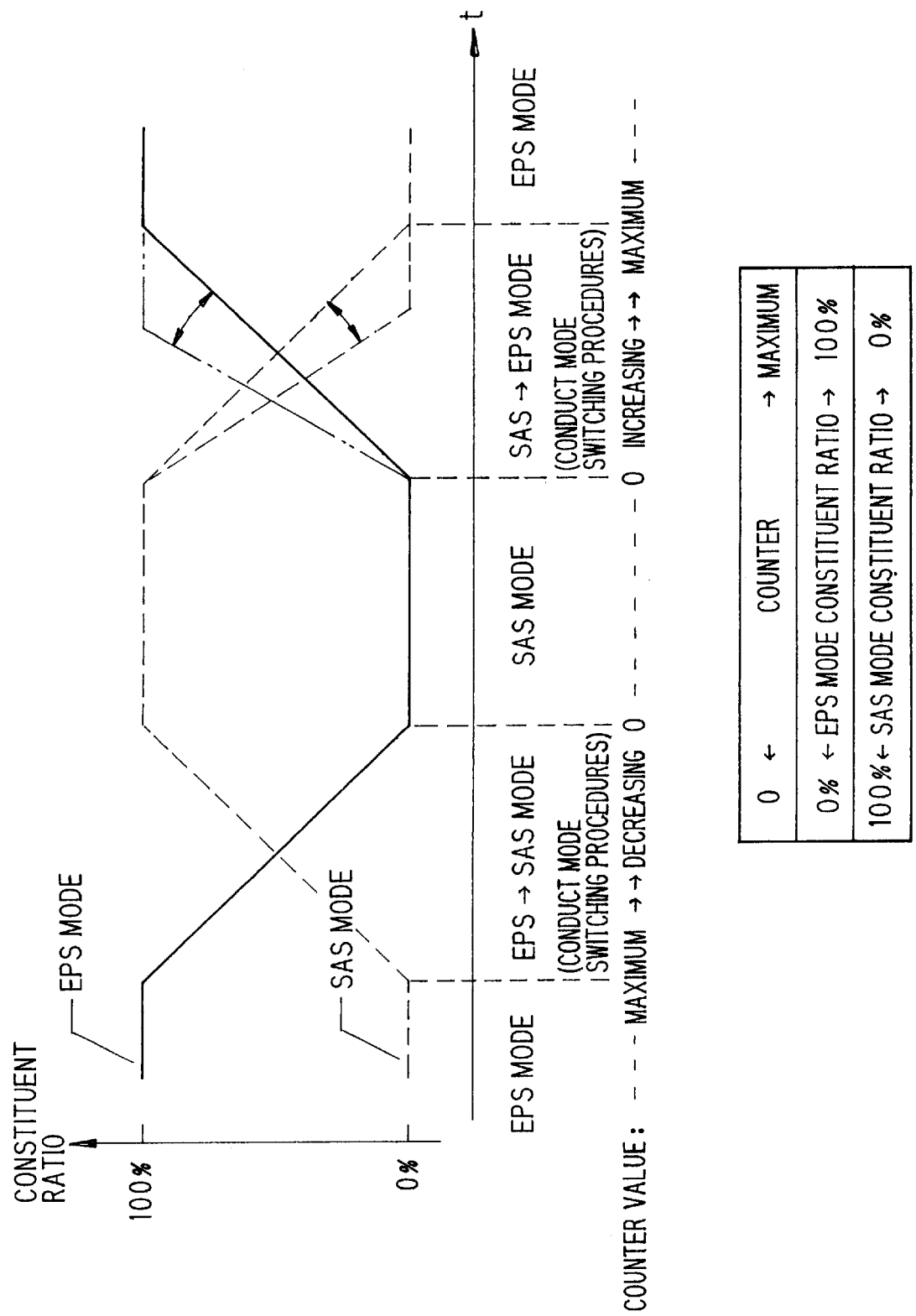
FIG. 9 is a time chart showing the procedures for mode switching between the SAS mode and the EPS mode referred to in the flow chart of FIG. 7.
Figure 10:
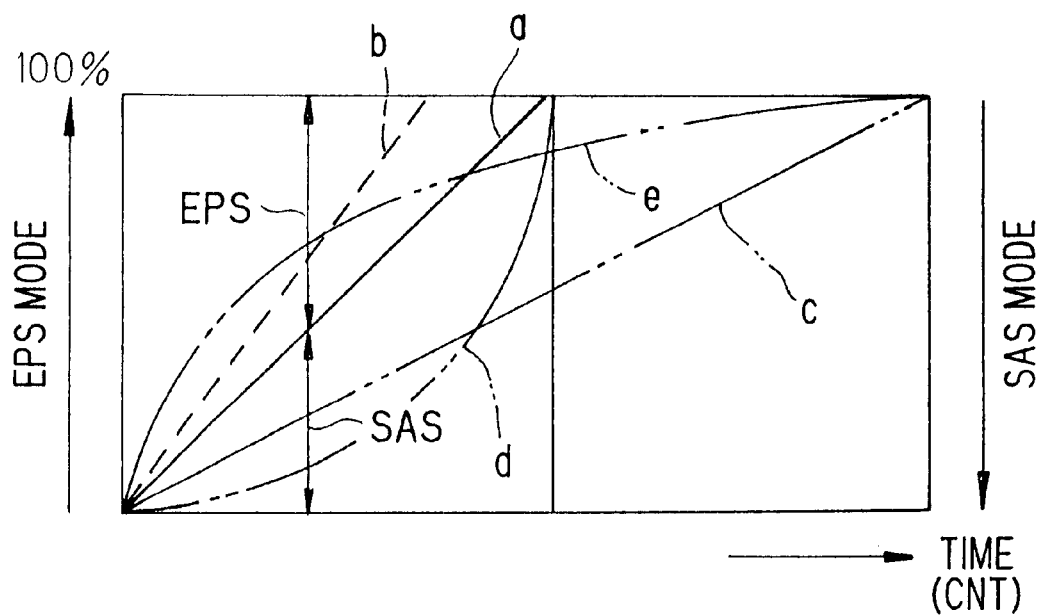
FIG. 10 is an explanatory graph showing a characteristic for determining constituent ratios of the steering assist torque determined in the SAS mode and that determined in the EPS mode.

Explaining this with reference to a time chart illustrated in FIG. 9, the constituent ratios of the torques in the two modes are varied with time (a value of a time counter (down counter). FIG. 10 is an explanatory graph showing a characteristic a which determines the constituent ratio relative to time (the counter value). When the counter value has reached zero, in other words when a predetermined time has lapsed, it is determined that the procedures for mode switching is completed.

Figure 4:
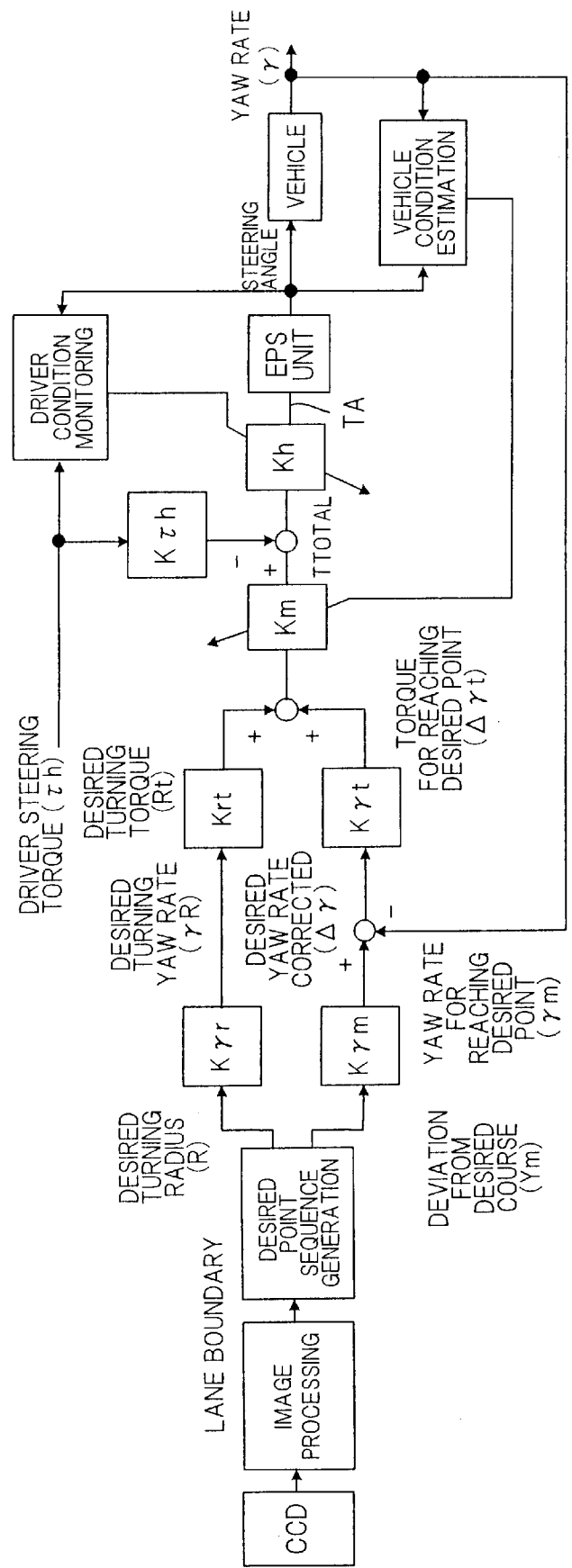
FIG. 4 is a block diagram showing functionally the operation of the SAS ECU illustrated in FIG. 2.
Figure 5:
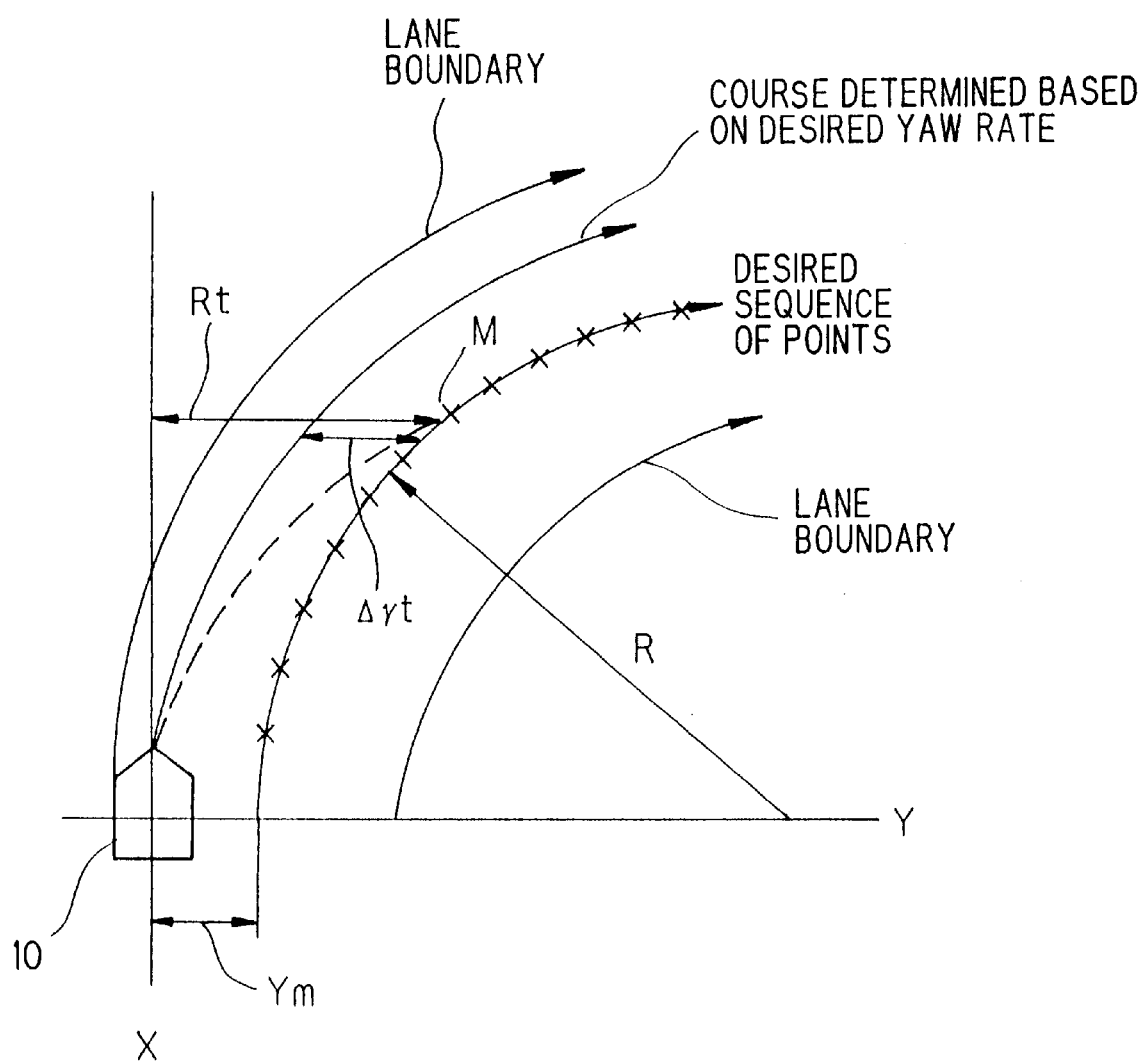
FIG. 5 is an explanatory view showing the operation of the SAS ECU illustrated in FIG. 2.

Since it is assumed that the control is just switched to the SAS mode so that the lane holding steering assist torque in the SAS mode has not been determined, the power steering assist torque in the EPS mode is immediately determined as a torque command (TA shown in FIG. 4). The program then proceeds to S114 in which the motor current command is determined and output based on the determined steering assist torque (more precisely, the torque command).

In the next loop, the program proceeds, via S100, to S102 in which it is determined whether the procedures for switching has been completed by checking if the counter value has reached zero or not.

If the result in S102 is still negative, the program proceeds to S104 in which the flag bit is again inverted, i.e., is reset to 0. The program proceeds, via S106, to S116 in which the detected steering torque $\tau h$ is read, to S118 in which it is determined whether the detected torque $\tau h$ is less than a reference value $\tau hr$ (e.g., 35 kgf·cm).

It should be noted here that, instead of the steering torque, a steering speed (the rotational speed of the steering wheel 14 determined in terms of the differential or difference $\Delta \theta$ of the steering angle $\theta$ obtained from the output of the steering angle sensor 44) can be used in S116 and can be compared with a reference speed $\Delta \theta r$ in S118. In that case, the reference speed should be greater than a steering speed necessary for usual lane changing. The reference speed should be determined taking into account, for example, a steering speed required for avoiding an obstacle on the road.

It should also be noted here that both the steering torque and the steering speed can be used in S116 and S118 in the embodiment.

When the result in S118 is affirmative, the program proceeds to S120 in which the lane holding steering assist torque is determined based on the deviation from the lane center in accordance with the characteristics shown in FIG. 6 for keeping the vehicle traveling along a lane. (This procedure will be the same if the steering speed $\Delta \theta$ is used in S116 and is determined to be less than the reference speed $\Delta \theta r$ set in the manner mentioned above in S118.)

The program then proceeds to S112 in which the aforesaid procedures for mode switching are conducted. Specifically, the steering assist torque of the SAS mode and that of the EPS mode are determined in accordance with constituent ratios determined by the characteristic a in FIG. 10 set relative to time (counter value) such that the ratio of the SAS lane holding steering assist torque increases and the ratio of the EPS power steering assist torque decreases with increasing time (counter value CNT).

Since, in the present example, this is the first time that the steering assist torque is determined in the SAS mode, the (lane holding) steering assist torque in the SAS mode is relatively small. The program then proceeds to S114 in which the lane holding steering assist torque in the SAS mode and the assist power steering assist torque in the EPS mode are summed to obtain the torque command TA, as shown in the block diagram of FIG. 4, and the motor current command is determined and is output based on the sum TA.

In the third program loop, the flag bit is again inverted in S104 and the EPS power steering assist torque is determined in S110. The above-mentioned procedures are repeated each time the program is looped.

Thus, the determination of the EPS power steering assist torque and the SAS lane holding steering assist torque are repeated. The constituent ratio of the SAS lane holding steering assist torque increases with an increasing number of program loops and, when the counter value has reached zero (in other words when it is determined in S102 that the procedures for mode switching have been completed), the steering assist torque is only that of the SAS mode, as illustrated in FIG. 9.

The time is flexibly set to a value ranging from several hundred msec to 3 sec. As a result, the switching from the EPS mode to the SAS mode is conducted gradually and hence, smooth. When the mode is switched from SAS to EPS, the time is fixed to be 2 sec or thereabout.

The procedure in S118 is again explained in detail.

As mentioned above, when the steering assist torque is controlled such that the vehicle travels along the lane, the mode of control should preferably be switched to that for the conventional power steering, if the driver has an intention to steer by himself so as to, for example, avoid an obstacle in an emergency.

For that reason, the embodiment is configured to have S118 in which, if it is determined that the driver moves the steering wheel 14 with torque τh greater than the reference torque τhr (or with the speed greater than the reference speed Δθ), in other words if it is determined that the driver has an intention to steer, the program proceeds to S124 in which the steering assist torque (for power steering) in a pseudo EPS mode is determined in accordance with the characteristics shown in FIG. 6 in response to the detected steering torque.

With this arrangement, in an emergency such as when an obstacle exists ahead of the vehicle, if the driver manipulates the steering wheel 14 with torque greater than the reference value or with speed greater than the reference speed, the driver's steering is assisted by the power steering assist torque in the pseudo EPS mode.

Moreover, in a case that the steering wheel 14 is unintentionally rotated by, for example, a force exerted upon the vehicle wheels due to a disturbance such as a wind exerted at the side of the vehicle, if the driver grips the steering wheel 14 firmly at that moment he can obtain the power steering torque assist in the pseudo EPS mode. Such a mode switching, when initiated, is effected gradually (and hence smoothly) by the procedures mentioned with reference to S112.

It should be noted that, after switching to the pseudo EPS mode, when the steering torque (or speed) decreases below the reference value, the SAS mode control is resumed. In that sense, this provisional EPS mode is named the "pseudo" EPS mode.

When the SAS mode is later switched to the EPS mode, the switching will be conducted gradually in the manner described below.

This switching from the SAS mode to the EPS mode is now explained with reference to the same figure.

In this case, the result in S100 is negative and the program proceeds to S122 in which it is determined whether the procedures for mode switching has been completed. Assuming that the mode is just switched from SAS to EPS, the result in S122 is normally negative, and the program proceeds to S104 in which the flag bit is inverted, specifically the flag bit is reset to 0, to S106 in which the flag bit is checked.

Since the flag bit was reset to 0, the program proceeds to S116 in which the detected steering torque τh is read, to S118 in which it is determined whether the detected steering torque τh is less than the reference value τhr. When the result is affirmative, the program proceeds to S120 in which the lane holding steering assist torque is determined in the SAS mode. The steering speed can also be used in S116, S118.

In the next program loop, the flag bit is again inverted in S104 and the program proceeds to S108, S110 in which the power steering assist torque is determined in the EPS mode. The above procedures are repeated and the SAS lane holding steering assist torque and the EPS power steering assist torque are alternatively determined each time the program is looped.

Thus, the EPS power steering assist torque and the SAS lane holding steering assist torque are determined in accordance with the constituent ratios determined by the characteristic a and time (the value CNT of an up-counter). The two values are summed and the motor current command is determined based on the sum in S114. When the up-counter value has reached its maximum value (MAX), it is determined that the procedures for switching has been finished.

Having been configured in the foregoing manner, when the system is equipped with the SAS mode (control mode by the SAS ECU 74) and the EPS mode (control by the EPS ECU 76), the system can switch the mode (control) gradually and smoothly, thereby preventing the occurrence of disadvantages including that the vehicle driver experiences annoyance upon sensing a change in steering assist.

Moreover, the system switches the mode (control) to the EPS mode, in response to the driver's intention to change lanes or to avoid an obstacle, freely at his discretion. Since the switching is also effected gradually and hence smoothly in that case, the driver is free from experiencing any possible annoyance upon sensing a change in steering torque assist.

Figure 7:
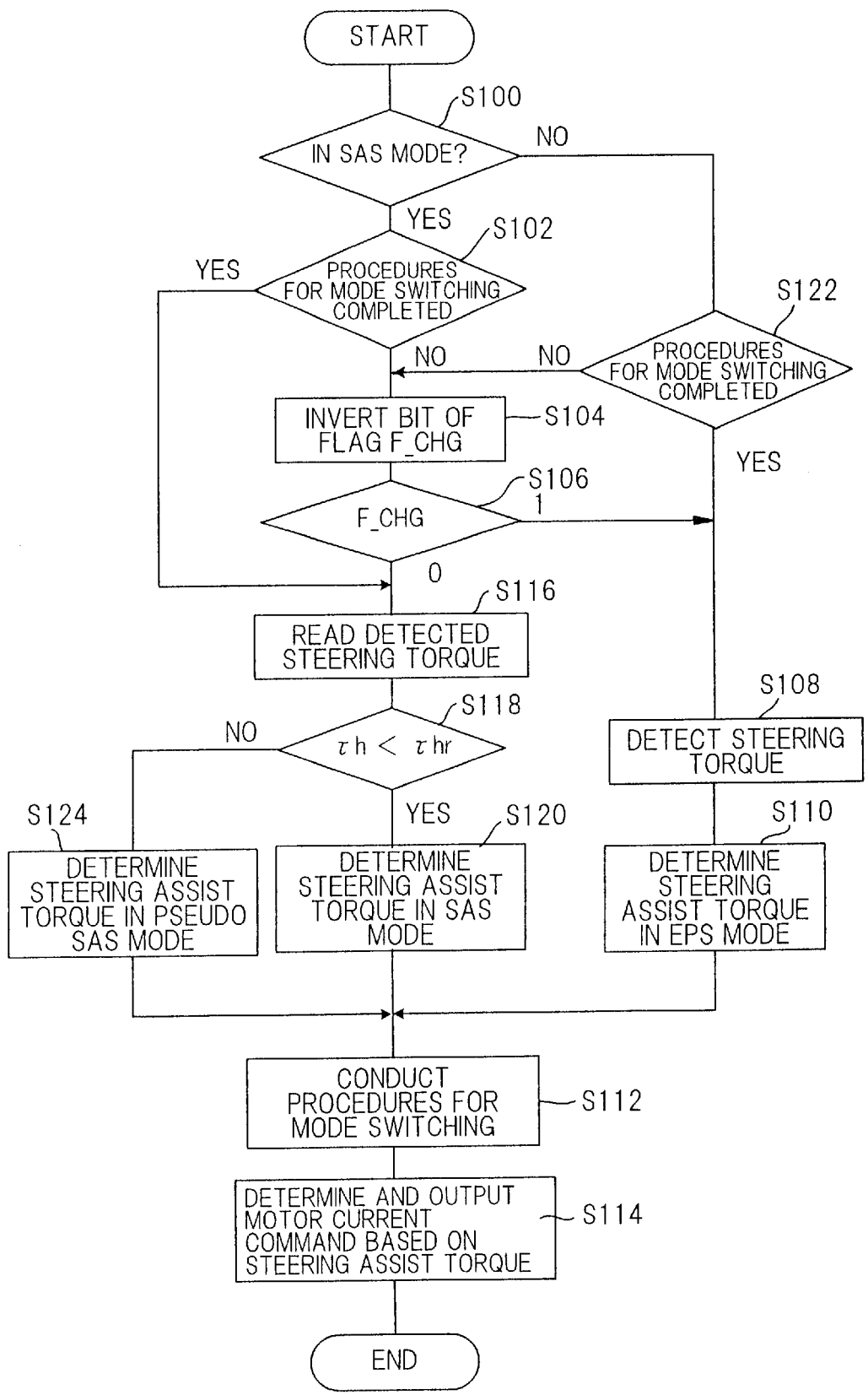
FIG. 7 is a flow chart showing the operation of the system according to the invention illustrated in FIG. 1.
Figure 8:
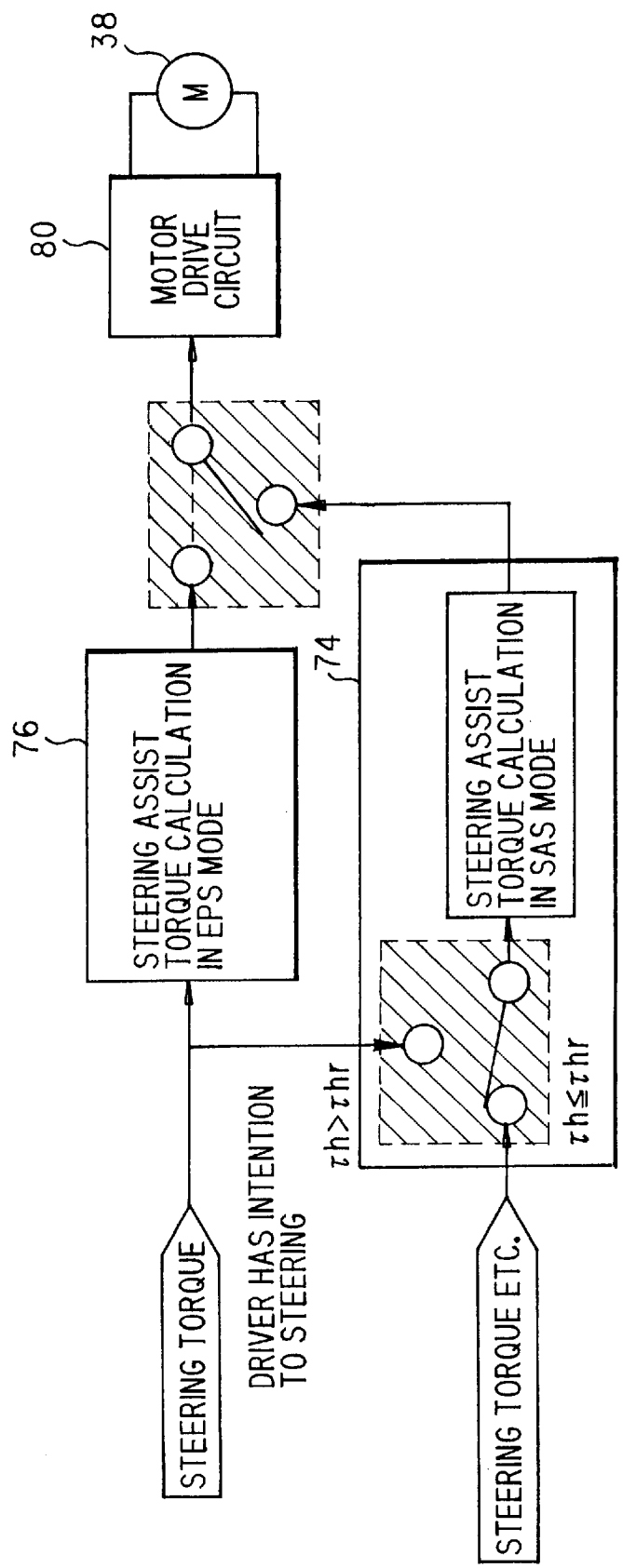
FIG. 8 is a block diagram similarly showing the operation of the system in a functional manner.
Figure 11:
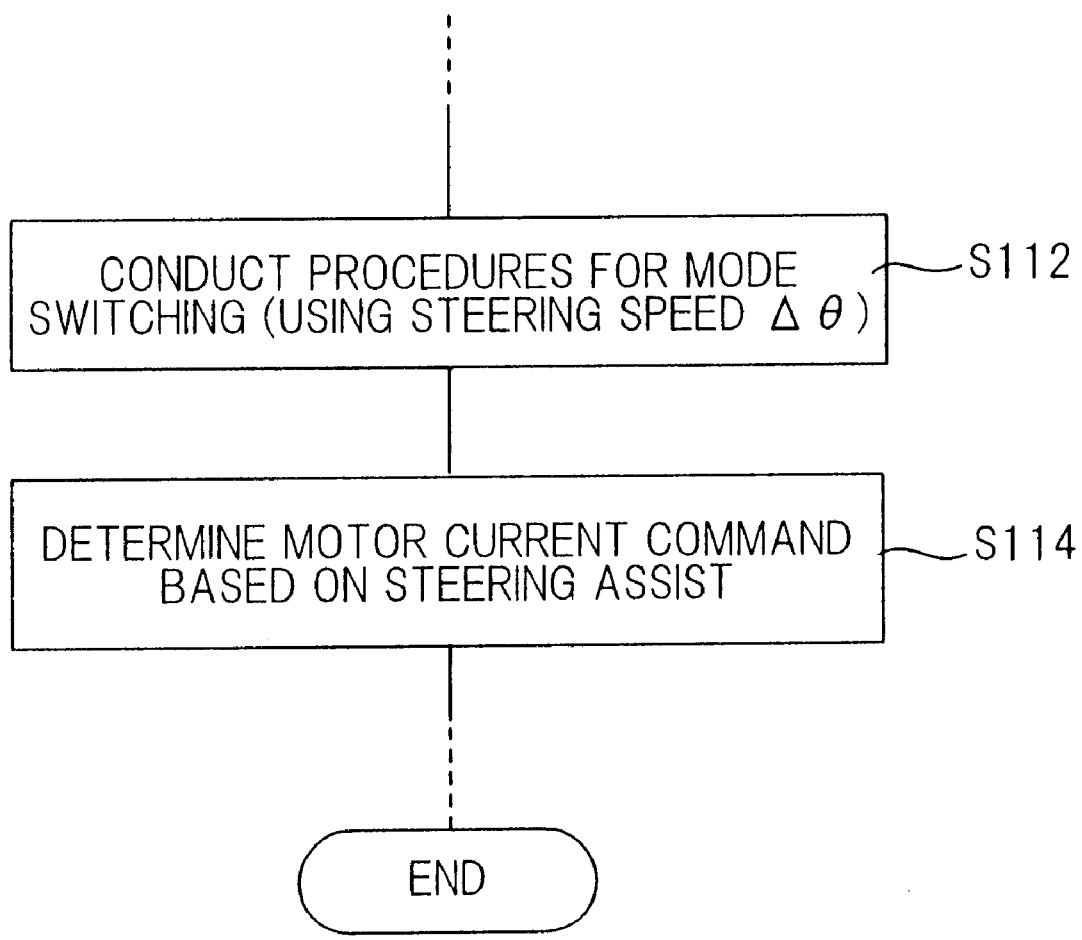
FIG. 11 is a part of the flow chart shown in FIG. 7, but showing the operation of the system according to a second embodiment of the invention.

FIG. 11 is a part of the flow chart of FIG. 7 showing the operation of the system according to a second embodiment of the invention.

In the second embodiment, the procedures for mode switching in S112 is conducted based on the aforesaid steering speed Δθ. Specifically, the time constant of characteristic determining the constituent ratio is modified to increase with increasing steering speed Δθ. The characteristic used in the second embodiment is marked with "b" in FIG. 10. In the second embodiment, as illustrated by phantom lines in FIG. 9, the switching from the SAS mode to the EPS mode can be completed within a shorter time.

More specifically, the switching procedures to the EPS mode can be finished in a time which decreases with increasing degree of driver's intention to participate in steering. This can also be achieved by varying the counter value in response to the steering speed. The other configuration and construction as well as the advantages are the same as those of the first embodiment.

In the foregoing embodiments, the characteristic a or b shown in FIG. 10 are mere examples. The characteristic should be determined such that the switching procedures are finished without causing the driver to feel annoyance upon sensing a change in steering assist and may be set as c, d, or e in FIG. 10.

The embodiments are thus configured to have a system for controlling steering of a vehicle, including: steering means (steering wheel 14, steering gear 24) having an actuator (electric motor 38) which steers driven wheels (front wheels 32) of the vehicle; first steering control means (EPS ECU 76) for controlling the actuator; first detecting means (CCD camera 64, image processing ECU 68) for detecting a lane condition of a road on which the vehicle travels; second detecting means (yaw rate sensor 82, etc.) for detecting motion of the vehicle; steering assist torque calculating means (SAS ECU 74) for calculating a steering assist torque necessary for holding a positional relationship between the vehicle and the lane condition; torque detecting means (torque sensor 42) for detecting a steering torque ($\tau h$) manually applied to the steering means by the driver; and second steering control means (SAS ECU 74) for calculating a torque command (TA) to be output to the first steering control means (EPS ECU 76) based on the steering assist torque calculated by the steering assist torque calculating means and the detected steering torque ($\tau h$) to control the actuator such that the torque command (TA) decreases. Said system includes switching means (S100 to S124) for switching between the mode of control (EPS MODE) by the first steering control means (EPS ECU 76) and the mode of control (SAS MODE) by the second steering control means (SAS ECU 74) gradually with respect to time, thereby ensuring to switch the mode of control smoothly and preventing the occurrence of disadvantages including that the vehicle driver experiences annoyance upon sensing a change in steering assist.

In the system, the switching means switches from the mode of control (SAS MODE) by the second steering control means (SAS ECU 74) to the mode of control (EPS MODE) by the first steering control means (EPS ECU 76), when the detected steering torque ($\tau h$) is greater than a reference value ($\tau hr$), thereby ensuring to switch the mode of control smoothly and preventing the occurrence of disadvantages including that the vehicle driver experiences annoyance upon sensing a change in steering assist when the mode of control is switched in response to the driver's intention to steer by himself.

The system further includes steering speed detecting means (steering angle sensor 44) for detecting a steering speed ($\Delta\theta$) manually applied to the steering means by the driver; and wherein the switching means switches from the mode of control (SAS MODE) by the second steering control means (SAS ECU 74) to the mode of control (EPS MODE) by the first steering control means (EPS ECU 76), when the detected steering speed ($\Delta\theta$) is greater than a reference value ($\Delta\theta r$), thereby ensuring to switch the mode of control smoothly and preventing the occurrence of disadvantages including that the vehicle driver experiences annoyance upon sensing a change in steering assist when the mode of control is switched in response to the driver's intention to steer by himself.

In the system, the switching means switches from the mode of control (SAS MODE) by the second steering control means (SAS ECU 74) to the mode of control (EPS MODE) by the first steering control means (EPS ECU 76) in a time which deceases with increasing detected steering torque ($\tau h$) or steering speed ($\Delta\theta$), thereby ensuring to switch the mode of control smoothly and preventing the occurrence of disadvantages including that the vehicle driver experiences annoyance when the mode of control is switched in response to the driver's intention to steering by himself.

In the system, the steering torque calculating means (SAS ECU 74) calculates the steering assist torque in accordance with a constituent ratio determined with respect to time when the mode of control (EPS MODE) by the first steering control means (EPS ECU 76) and the mode of control (SAS MODE) by the second steering control means (SAS ECU 74) are switched, thereby ensuring to switch the mode of control smoothly and preventing the occurrence of disadvantages including that the vehicle driver experiences annoyance upon sensing a change in steering assist when the mode of control is switched in response to the driver's intention to steer by himself, and shortening the switching procedures in response to the degree of driver's intention to steer by himself.

Although an embodiment was explained in which the steering assist mechanism doubles as a conventional power steering mechanism, the two mechanisms can instead be provided independently. The steering assist mechanism can be hydraulically powered instead of being electrically powered as in the foregoing embodiment.

The steering angle sensor 44 and other sensors can be differently configured from what was described in the foregoing and their locations are limited only by the need to provide the required values.

Although the mode switching is effected in accordance with the algorithm shown in the flow chart, it is alternatively possible to provide a switch 100 at an appropriate location of passenger room dashboard as shown by phantom lines to be handled by the driver such that the control is changed in response to the output of the switch 100.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling steering of a vehicle, comprising:
   steering means having an actuator which steers driven wheels of the vehicle;
   first steering control means for controlling the actuator;
   first detecting means for detecting a lane condition of a road on which the vehicle travels;
   second detecting means for detecting motion of the vehicle;
   steering assist torque calculating means for calculating a steering assist torque necessary for holding a positional relationship between the vehicle and the lane condition;
   torque detecting means for detecting a steering torque manually applied to the steering means by the driver;
   second steering control means for calculating a torque command to be output to the first steering control means based on the steering assist torque calculated by the steering assist torque calculating means and the detected steering torque to control the actuator such that the torque command decreases; and
   switching means for switching between the mode of control by the first steering control means and the mode of control by the second steering control means gradually with respect to time.

2. A system according to claim 1, wherein the switching means switches from the mode of control by the second steering control means to the mode of control by the first steering control means, when the detected steering torque is greater than a reference value.

3. A system according to claim 2, wherein the switching means switches from the mode of control by the second steering control means to the mode of control by the first steering control means in a time which decreases with increasing detected steering torque.

4. A system according to claim 1, further including:
steering speed detecting means for detecting a steering speed manually applied to the steering means by the driver;
and wherein the switching means switches from the mode of control by the second steering control means to the mode of control by the first steering control means, when the detected steering speed is greater than a reference value.

5. A system according to claim 4, wherein the switching means switches from the mode of control by the second steering control means to the mode of control by the first steering control means in a time which decreases with increasing detected steering speed.

6. A system according to claim 1, wherein the steering torque calculating means calculates the steering assist torque in accordance with a constituent ratio determined with respect to time when the modes of control by the first steering control means and the second steering control means are switched.

7. A system according to claim 6, wherein the steering torque calculating means calculates the steering assist torque in accordance with the constituent ratio determined which increases with increasing time, when the mode of control by the first steering control means is switched to the mode of control by the second steering control means.

8. A system according to claim 1, further including:
driver's intention determining means for determining whether a driver has an intention to initiate steering;
and wherein the switching means switches from the mode of control by the second steering control means to the mode of control by the first steering control means, when it is determined that the driver has the intention to initiate steering.

9. A method of controlling steering of a vehicle, including:
steering means having an actuator which steers driven wheels of the vehicle;
first steering control means for controlling the actuator;
first detecting means for detecting a lane condition of a road on which the vehicle travels;
second detecting means for detecting motion of the vehicle;
steering assist torque calculating means for calculating a steering assist torque necessary for holding a positional relationship between the vehicle and the lane condition;
torque detecting means for detecting a steering torque manually applied to the steering means by the driver, and
second steering control means for calculating a torque command to be output to the first steering control means based on the steering assist torque calculated by the steering assist torque calculating means and the detected steering torque to control the actuator such that the torque command decreases;
wherein the method comprises the step of:
switching between mode of control by the first steering control means and the mode of control by the second steering control means (SAS ECU 74) gradually with respect to time.

10. A method according to claim 9, wherein switching from the mode of control by the second steering control means to the mode of control by the first steering control means, when the detected steering torque is greater than a reference value.

11. A method according to claim 10, wherein switching from the mode of control by the second steering control means to the mode of control by the first steering control means in a time which decreases with increasing detected steering torque.

12. A method according to claim 9, further including:
steering speed detecting means for detecting a steering speed manually applied to the steering means by the driver;
and wherein switching from the mode of control by the second steering control means to the mode of control by the first steering control means, when the detected steering speed is greater than a reference value.

13. A method according to claim 12, wherein switching from the mode of control by the second steering control means to the mode of control by the first steering control means in a time which decreases with increasing detected steering speed.

14. A method according to claim 9, wherein calculating the steering assist torque in accordance with a constituent ratio determined with respect to time when the modes of control by the first steering control means and the second steering control means are switched.

15. A method according to claim 14, wherein calculating the steering assist torque in accordance with the constituent ratio determined which increases with increasing time, when the mode of control by the first steering control means is switched to the mode of control by the second steering control means.

16. A method according to claim 9, further including:
driver's intention determining means for determining whether a driver has an intention to initiate steering;
and wherein switching from the mode of control by the second steering control means to the mode of control by the first steering control means, when it is determined that the driver has the intention to initiate steering.

17. A computer program embodied on a computer-readable medium for controlling steering of a vehicle, including:
steering means having an actuator which steers driven wheels of the vehicle;
first steering control means for controlling the actuator;
first detecting means for detecting a lane condition of a road on which the vehicle travels;
second detecting means for detecting motion of the vehicle;
steering assist torque calculating means for calculating a steering assist torque necessary for holding a positional relationship between the vehicle and the lane condition;
torque detecting means for detecting a steering torque manually applied to the steering means by the driver, and
second steering control means for calculating a torque command to be output to the first steering control means based on the steering assist torque calculated by the steering assist torque calculating means and the detected steering torque to control the actuator such that the torque command decreases;
wherein the computer program comprises the step of:
switching between the mode of control by the first steering control means and the mode of control by the second steering control means (SAS ECU 74) gradually with respect to time.

* * * * *